Jan. 7, 1936.  H. C. ROSS  2,026,801

HUMIDITY AND TEMPERATURE CONTROL FOR INCUBATION

Filed July 26, 1929  2 Sheets-Sheet 1

INVENTOR
Hazen C. Ross
BY
ATTORNEY

Jan. 7, 1936.   H. C. ROSS   2,026,801
HUMIDITY AND TEMPERATURE CONTROL FOR INCUBATION
Filed July 26, 1929   2 Sheets-Sheet 2
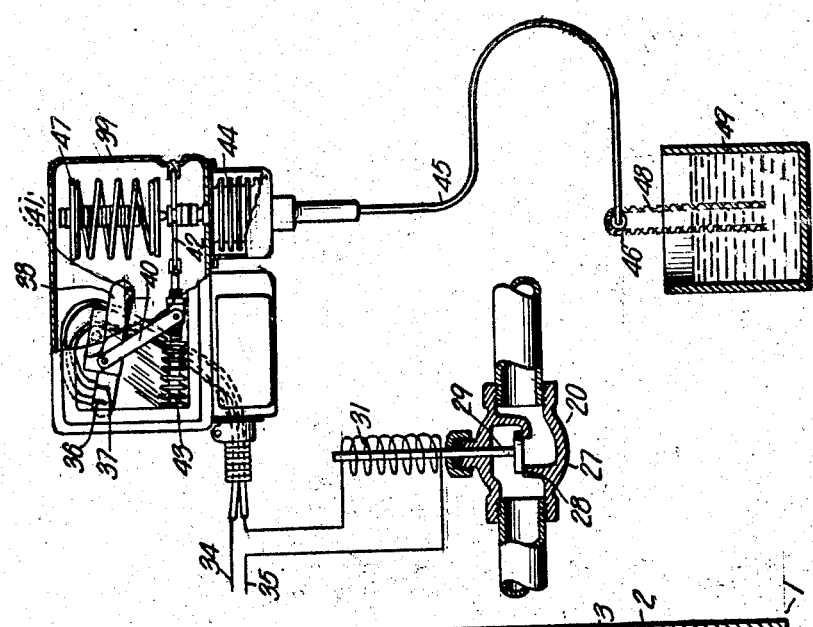
INVENTOR
Hazen C. Ross
BY
ATTORNEY Patented Jan. 7, 1936

2,026,801

UNITED STATES PATENT OFFICE 2,026,801

HUMIDITY AND TEMPERATURE CONTROL FOR INCUBATION

Hazen C. Ross, Junction City, Kans.

Application July 26, 1929, Serial No. 381,170

2 Claims. (Cl. 119—35)

My invention relates to air conditioning apparatus, and more particularly to means for controlling the temperature and humidity of an incubator chamber or the like, the principal objects of the invention being to automatically regulate the temperature and humidity of air in an incubator, to effect automatic delivery of a humidifying agent to the chamber when the humidity falls below a predetermined value, and to combine automatically operating humidifying means with temperature modifying means.

In accomplishing these and other objects of the invention, I have provided improved details of structure, the preferred forms of which are illustrated in the accompanying drawings, wherein:

Fig. 2 is a vertical central section on the line 2—2, Fig. 1 illustrating the direction of flow of air currents circulating in the housing, a ventilating conduit being shown fragmentarily.

Fig. 3 is a diagrammatic view of apparatus for controlling flow of fluids toward the chamber, and illustrating the member for controlling the humidity of the chamber, a fluid conduit being shown fragmentarily.

Figure 1:
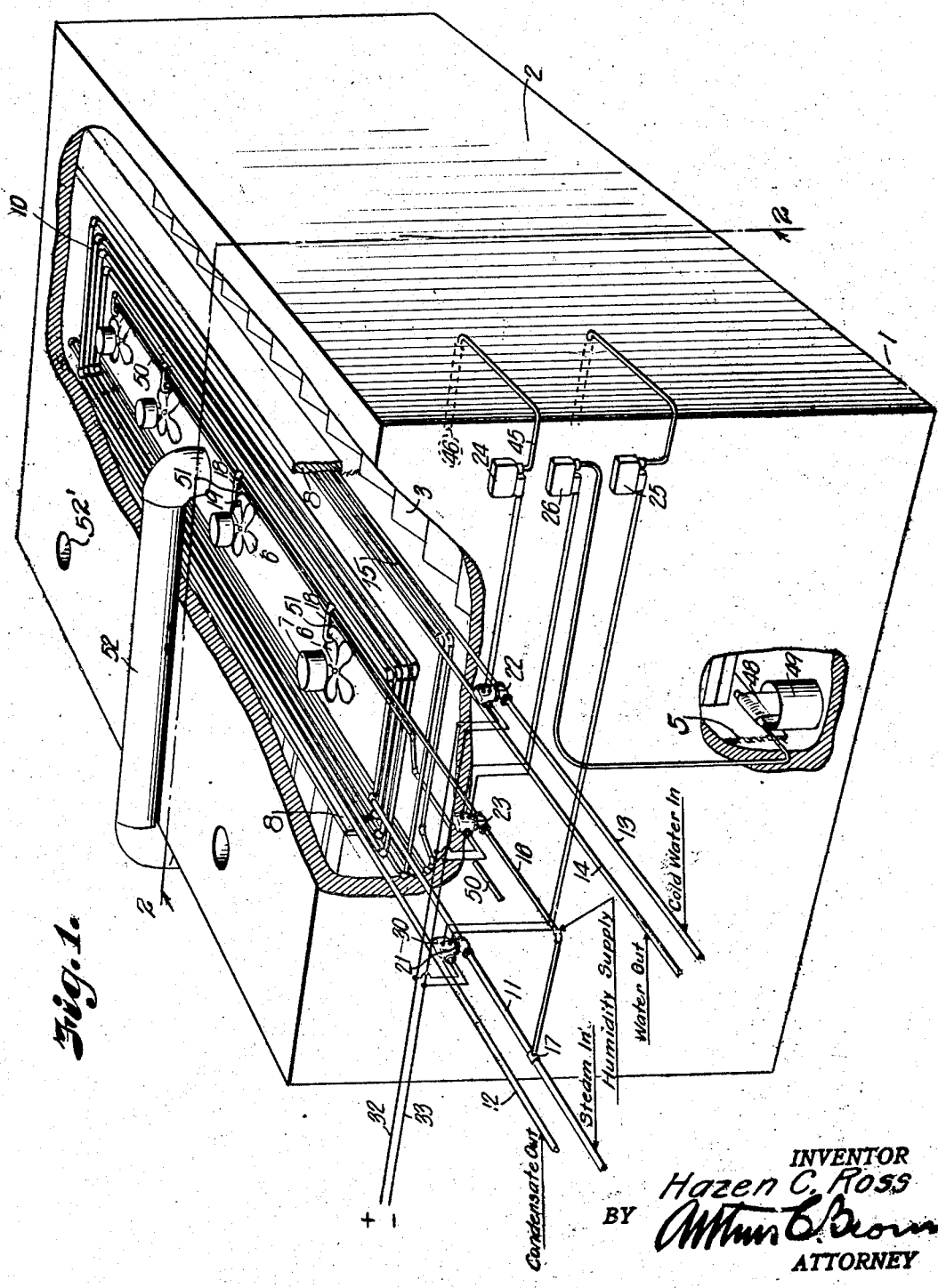
Fig. 1 is a perspective and partly diagrammatic view of an incubator equipped with my improved air-conditioning apparatus, walls of the housing being broken away to show interior construction and a humidity control member, and fluid supply line being shown fragmentarily.

Referring in detail to the drawings:

1 designates generally a housing including side walls 2 forming a chamber and illustrated as provided with tiers of trays 3 spaced to provide a central passage 4 and comprising an incubator. Curtains 5 depend in the passage in front of the trays, and form with the side walls the tray-containing spaces. The horizontal edges of the curtains are spaced from the top and bottom of the housing.

Fans 6 each preferably actuated by an individual motor 7 are mounted centrally above the central passage for blowing air downwardly to pass laterally under the lower edges of the curtains and upwardly among the trays. The air is drawn by the fans to effect recirculation through the chamber.

The curtains are preferably supported by parallel longitudinally extending plates 8 forming walls for controlling the downward movement of induced air currents and having upper edges spaced from the top of the housing to form restricted apertures 9 for effecting flow of air from the tray spaces into the upper end of the central passage.

A heating coil 10 comprising a plurality of convolutions is arranged adjacent the fans in the upper end of the housing to heat the air therein, the line of pipe or conduit comprising the coil being bent to form coils disposed in a horizontal plane, and having a steam inlet pipe 11 and a discharge or outlet pipe 12 for movement of condensates away from the coil.

A second conduit comprising a line of pipe including an inlet 13 and an outlet 14 is arranged in a coil 15 having a plurality of vertically parallel convolutions adjacent the plates 8 and spaced laterally from the coil 10, and adapted to conduct a cooling medium into the space through which air is driven by the fans.

A third conduit 16 for supplying a humidifying agent comprises preferably a branch of the heating medium conduit connected to the inlet 11 at 17, and is provided with branches 18 having downwardly directed nozzles 19 located above the fans for directing steam into the currents of air blown by the fans toward the tray containing spaces.

Each of the conduits is provided with a valve 20 interposed respectively at 21 in the steam inlet 11, 22 in the cooling medium inlet 13, and 23 in the humidifying medium branch 16, the valves tending to close and being electrically operated and being controlled by thermostatically operated switches 24, 25, and 26 respectively as presently described.

The valves 20 include housings 27 having seats 28, and stems 29 operable by electrically actuated means represented by casings 30 and which may include solenoids 31 supplied with current through line wires 32 and 33 connected with a source of electrical energy not shown, and connected with the solenoids by branches 34 and 35.

In each instance, one branch 34 passes through the casing and the other branch is connected with a terminal of the solenoid, the branches being connected with contacts 36 and 37 in one end of a mercury switch tube 38 pivotally mounted in a housing 39 and movable by a link 40 for permitting mercury 41 to flow toward the contacts for closing the circuit through the solenoid.

The lower end of the link is pivotally connected to a pivoted toggle bar 42 controlled by a horizontally arranged and inclined coil spring 43 for effecting snap action of the link. The bar is hinged vertically for tilting the tube by a flexible bellows 44 influenced by expansion and contraction of fluid in a tube 45 extending in the tray space and provided with a bulb 46, whereby variations in temperature may effect opening or closing of the circuit through the solenoid. The tube is returned to open-circuit position by a spring 47 in the housing bearing against the stem of the flexible bellows element.

The thermostatically controlled switches 24 and 25 are adapted respectively for controlling the flow of steam and of the cooling medium through the respective coils responsively to changes in temperature in tray spaces.

The switch 26 for controlling flow of steam to the nozzles 19 is adapted to operate responsively to changes in humidity in the tray spaces, and to accomplish this result a wick 48 is applied to the bulb and suspended in a pan or cup 49 containing water, whereby the heat-responsive element is constituted a wet bulb thermometer, and the responses of the thermometer to heat will be modified proportionately to the extent of saturation of the air in the tray spaces.

In order to prevent vapors condensed in the steam branch 16 from entering the chamber, a drain pipe 50 is provided extending beneath the nozzle branches 18 and communicating therewith through short vertical pipes 51. Liquid formed by condensation of steam in the branch 16 or branches 18 will thus be diverted and withdrawn from the steam flowing to the nozzles 19, and may flow by gravity from the branches 18 toward a suitable discharge outlet exterior to the chamber.

A ventilating air conduit 52 may be connected to the housing for supplying exterior air thereto. The top of the housing may also be provided with draft openings 52', as shown in Fig. 1.

In setting up apparatus equipped as described, suitable connections are made with means for supplying steam and cold water, and for energizing the fan motors and valve operating members. The thermostatic elements may be adjusted to control flow of fluids for the particular service of the apparatus. When employed for incubating purposes, the steam control members will be adapted to effect flow of steam to raise the temperature in the chamber to approximately 100 degrees, and bring about maintenance of the temperature at such level.

The valve in the cold water coil will be opened when the temperature in the chamber rises above the predetermined limit, to effect cooling of the air blown by the fan and circulated through the tray spaces.

The humidity control elements may be adapted to operate at any temperature and are particularly adapted to operate within the range of temperatures maintained by the steam and cold water control elements. Assuming the normal temperature of the chamber to be 100, for example the humidity control switch will be prevented from operating at such temperature when the humidity is normal because the springs 43 and 47 are set relatively to the flexible bellows 44 so that the circuit to the valve is open through the contacts 36 and 37, but should the moisture content of the air in the tray space decrease below the set amount, the dryness of the air will cause more rapid evaporation of the water from the wick, thereby reducing the temperature of the bulb 46 and causing the flexible bellows 44 to contract. Contraction of the bellows tips the mercury tube to circuit closing position for energizing the magnet 31 to open the valve 20 and permit flow of steam through the nozzles 19 for increasing the humidity of the incubator.

When the air in the tray chamber becomes sufficiently laden with moisture, evaporation from the wick is retarded so that the bulb 46 is heated causing expansion of the bellows 44 to break the circuit of the magnet 31 allowing the valve to close, shutting off the supply of steam to the nozzles.

It is thus apparent that the humidity switch elements automatically control delivery of the humidifying agent to regulate the amount of moisture maintained in the tray space.

What I claim and desire to secure by Letters Patent is:

1. In an incubator, an egg compartment, an air distributing compartment having communication with the upper and lower portions of the egg compartment whereby air is circulated from the distributing compartment through the egg compartment and returned to the distributing compartment, a series of heating coils in the air compartment in the form of a rectangular loop, cooling coils arranged longitudinally of the air compartment, means controlled by the temperature in the egg compartment for delivering heating medium to said heating coils, independent means controlled by the temperature in the egg compartment for delivering cooling medium to the cooling coils, a series of fans in the air compartment within said loop for circulating air from the egg compartment to the air compartment back to the egg compartment, a steam pipe extending longitudinally in the air compartment and having nozzles arranged to discharge steam on said fans, and means controlled by the moisture content in the egg compartment for admitting steam to the steam pipe.

2. In an incubator, an egg compartment, an air distributing compartment having communication with the upper and lower portions of the egg compartment wherethrough air is circulated from the distributing compartment through the egg compartment and returned to the distributing compartment, a series of heating coils in the air distributing compartment, cooling coils arranged longitudinally of the air distributing compartment, means controlled by the temperature in the egg compartment for delivering heating medium to said heating coils, independent means controlled by temperature in the egg compartment for delivering cooling medium to the cooling coils, a series of fans having propeller type blades, means for supporting the fans in the air distributing compartment adjacent its communication with the egg compartment for circulating the air from the egg compartment to the air distributing compartment and back to the egg compartment, a steam pipe extending longitudinally of the air compartment and having nozzles arranged to discharge steam into the air passing through said fans so that the steam is mixed with the air in the distributing compartment by the action of the fan blades prior to its return to the egg compartment, and means controlled by the moisture content in the egg compartment for controlling admission of steam to the steam pipe.

HAZEN C. ROSS.